A. MALINOVSZKY.
BRICK, TILE, OR ANALOGOUS ARTICLE AND THE PROCESS OF MAKING SAME.
APPLICATION FILED APR. 19, 1910.
1,016,345.                                             Patented Feb. 6, 1912.
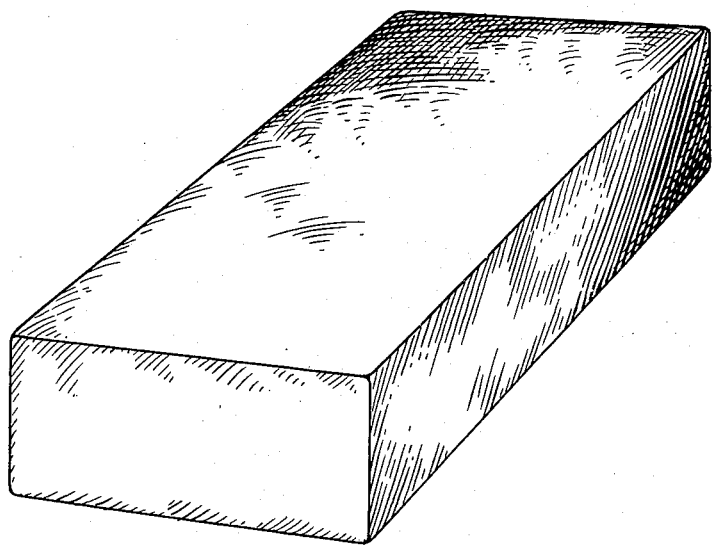
WITNESSES:                                              INVENTOR
                                                        ATTORNEY

UNITED STATES PATENT OFFICE.

ANDREW MALINOVSZKY, OF TOLEDO, OHIO, ASSIGNOR, BY DIRECT AND MESNE ASSIGNMENTS, OF ONE-FOURTH TO JOHN H. TAYLOR, OF SCHENECTADY, NEW YORK, AND THREE-FOURTHS TO THE SANITARY BRICK COMPANY, OF SCHENECTADY, NEW YORK, A CORPORATION OF NEW YORK.

BRICK, TILE, OR ANALOGOUS ARTICLE AND THE PROCESS OF MAKING SAME.

1,016,345.   Specification of Letters Patent.   Patented Feb. 6, 1912.

Application filed April 19, 1910. Serial No. 556,345.

*To all whom it may concern:*

Be it known that I, ANDREW MALINOVSZKY, a citizen of the United States, and resident of Toledo, in the county of Lucas and State of Ohio, have invented a certain new and useful Brick, Tile, or Analogous Article and the Process of Making Same; and I do hereby declare the following to be a full, clear, and exact description of the invention, such as will enable others skilled in the art to which it appertains to make and use the same, reference being had to the accompanying drawings, which form a part of this specification.

My invention relates to brick, tile, shingles, panels or the like, adapted for use in the construction of buildings, refrigerators, caskets, etc., but is not restricted to such uses as it may be used for any purpose for which it may be adapted or appropriate.

The object of my invention is to produce a brick, shingle, tile or the like which shall be of low cost, ornamental in appearance, strong and durable in construction, weatherproof, and capable of resisting chemical reactions, either acid or alkaline. In one form of my invention the resulting articles are capable of being worked with ordinary tools almost as easily as hard wood, and in such form is especially adapted for use as shingles, some kinds of tile, and as insulating material for electrical work; while in another form thereof the articles are highly refractory to heat, acid fumes, etc., so that they are adapted for use in fire proof structures, and as linings for furnaces, kilns, chimneys, and the like.

The invention is fully described in the following specification, and while, in its broader aspect, it is capable of embodiment in numerous forms and shapes to suit the requirements of the use to which it is to be put one form only of the same is illustrated in the accompanying drawings, which represent a brick.

In the making of my improved brick, tile or the like, I preferably combine the following ingredients in substantially the proportions noted, but such proportions may be varied without departing from the spirit of the invention:

Silicious sand _____ 73%
Calcium oxid _____ 5%
Pegmatite _____ 12%
Magnesia silicate _____ 6%
Aluminum hydroxid _____ 4%

To obtain the best results it is preferable to finely crush about 25% of the silicious sand used, or about 18% of the entire mass, so that it will pass through a sieve of not less than 140 mesh, and this is then mixed with the calcium oxid. The pegmatite and magnesia silicate are then thoroughly calcined so as to expel all the water of crystallization therefrom. Unless this is completely done, the subsequent heating or firing of the brick or other article will act to expel the remaining moisture and cause a checking or possible fracturing thereof. The crushing or reducing of a substantial portion of the sand to a powder prevents voids from occurring in the product. It may be said that the magnesia silicate used is in the form of serpentine rock, while the pegmatite is a finely crushed granite containing quartz, mica and feldspar. Pegmatite is used in preference to other varieties of granite on account of its greater friability. It is to be understood, however, that the word pegmatite as used in the claims is to be considered broadly as granite and not as a variety thereof.

A portion of the sand, the calcium oxid, pegmatite and magnesia silicate having been prepared as above stated, are placed with the other ingredients and the whole thoroughly dry-mixed. Sufficient water is then added to form a heavy mortar-like mass which may be molded in any well known manner into the desired form. Without preliminary air-drying, the molded articles are now ready for the operation of heating, baking or firing, the degree of heat required varying within wide limits in correspondence with the desired appearance of the articles and the use to which they are to be put.

To produce a fine, smooth-surfaced, unglazed brick, tile or other article, which can be carved or otherwise tooled, but which is durable and weather-proof, it is sufficient to steam-dry it for say eight to ten hours under a pressure of say 150 pounds. The article or material thus made is found to form a very efficient insulating material for all kinds of electrical work and to take the place of porcelain, pressed fiber and the other kinds of insulation now commonly used in such work.

If a hardened vitrified brick or other article is desired it may be fired in a kiln for say 24 to 30 hours at a temperature varying from 2220 to 2700 degrees Fahrenheit, or more, the hardness and completeness of the vitrification of the article varying, of course, directly with the time of exposure and the temperature. The higher temperature and longer exposure named will ordinarily harden and vitrify brick to such an extent as to adapt them for use in lining furnaces, or the like, as above stated.

While it is preferable ordinarily to use all of the ingredients mentioned above, either or both of the ingredients magnesia silicate and alumina may be omitted without materially affecting the use of the resulting article for certain purposes.

The purpose of alumina is to bind the particles of the mass together and to hold the impurities within the brick or other article instead of allowing them to work down through the mass and appear on the under side thereof in the form of crystals, as is otherwise the case. In other words, the use of alumina widens the zone of vitrification without permitting a fusion of the article. Where brick or the like are piled one on top of another within a kiln with only sand sprinkled between them, as is customarily done, and the alumina is omitted therefrom, the expelled impurities will cause a rigid cementing or adhering together of the adjoining articles, thus necessitating a breaking of the same apart. If the articles, however, from which the alumina is omitted are not burned immediately after molding, but are exposed to the air for two or three days, or for a sufficient length of time for the carbonic acid in the air to act thereon to effect the necessary hardening or binding action, they may be then burned without the expulsion of the impurities. Or, if, instead of air drying the articles, they are steamed for 8 or 10 hours, or for a suitable length of time for them to become sufficiently hardened to retain their integrity, they may then be burned in a kiln without expelling the impurities. When making articles in slab or thin form, as for instance one foot square and one-half inch thick, it is preferable to first air or steam dry the same before burning, as they can be then more easily handled without danger of breaking or bending.

The use of magnesia silicate or serpentine rock in the composition renders it tough and more pliable when hot and also prevents a cracking or checking of the same under changing weather or heat conditions. For this reason brick or other articles used in the construction of buildings or for any purpose which renders the same subject to sudden temperature changes or in which different parts of the article are subjected to different temperatures at the same time, should contain magnesia silicate. The inclusion of magnesia silicate also prevents an article from cracking when placed hot in a cooling water and enables it to stand a higher heat, while the exclusion thereof renders an article brittle and causes it to shrink quite materially from its original size. If alumina is omitted its proportion in the composition is preferably added to the pegmatite; if magnesia silicate is omitted its proportion is preferably added to the sand, and in case both of said ingredients are omitted the relative proportions of the other ingredients preferably remain about the same.

It is found that the presence of pegmatite in the composition, either with silica and calcium oxid alone or with all of the other ingredients mentioned is very important. Silica under the conditions existing herein is wholly infusible as it has no plasticity. It alone, therefore has no binding power. The addition of calcium oxid, however, gives to it sufficient binding power to permit handling from the press to the kiln and stacking up for burning. The calcium oxid does not react on the silica to produce vitrification, and for this reason a molded form composed of silica and calcium oxid alone is not very durable. The atmosphere easily disintegrates it so that great care must be taken to prevent the air from striking under the brick within the kiln, as otherwise crumbling may result. To overcome this difficulty and to produce a better, stronger and commercially practical article of this nature, pegmatite is added to the silica and calcium oxid, if such ingredients are used alone, or to the compound of which such ingredients form a part, as it is found by experiments that the presence of pegmatite therein produces a brick or other article that will endure a very high fire resistance and will, because of its perfect vitrification, be proof against any effect from atmosphere. In this way a first class enamel-faced brick can be produced, which would not be possible if the pegmatite was omitted from the other ingredients. The calcium oxid serves as a cement and also as a flux to the pegmatite, so that during burning a quick reaction takes place between the calcium oxid and the pegmatite. The cementation with the silica thus becomes so strong that all danger of crumbling is entirely overcome, a result which would be impossible without the pegmatite, as stated above.

It will, of course, be understood that the proportions of the different ingredients named may be varied to suit requirements, but, in actual practice, both the relatively soft and workable articles and the hard vitrified ones have been successfully produced with the mixture stated.

Having thus described my invention, what I claim as new, and desire to secure by Letters Patent, is,—

1. An article of the class described, composed of a compound obtained by heating together silica, calcium oxid and pegmatite.

2. An article of the class described, composed of a compound obtained by heating together silicious sand, calcium oxid and pegmatite, the sand forming a major portion of the entire mass and a substantial portion of the same being finely crushed.

3. An article of the class described, composed of a compound obtained by heating together silicious sand, calcium oxid, calcined magnesia silicate and pegmatite, the sand forming at least 60% and the pegmatite at least 10% of the entire mass.

4. An article of the class described, composed of a compound obtained by heating together silicious sand, calcium oxid, pegmatite, and calcined magnesia silicate, the sand constituting a major portion of the compound.

5. An article of the class described, composed of a compound obtained by heating together silicious sand, calcium oxid, calcined and ground serpentine rock, alumina and pegmatite, the sand forming at least 60% of the entire mass and the serpentine rock in sufficient quantity to form a binder.

6. An article of the class described, composed of a compound obtained by heating together silicious sand, calcium oxid, pegmatite and magnesia silicate in substantially the proportion stated, a substantial portion of the sand being finely ground and the magnesia silicate being calcined.

7. An article of the class described, composed of a compound obtained by heating together silicious sand, calcium oxid, pegmatite, magnesia silicate and alumina, in substantially the proportions stated.

8. An article of the class described, composed of a compound obtained by heating together silicious sand, 55 to 90%, calcium oxid, 2 to 7%, calcined magnesia silicate 4 to 10%, alumina 2 to 6% and pegmatite 10 to 20%.

9. The process of making articles of the class described, consisting in mixing silicious sand, calcium oxid and pegmatite, a major portion of the entire mass being sand, wetting the mixture to a molding consistency, molding the articles, and heating them to a temperature above that required to evaporate the moisture therefrom.

10. The process of making articles of the class described, consisting in mixing silicious sand, 55 to 90%, calcium oxid, 2 to 7%, and calcined pegmatite, 8 to 20%, a substantial portion of the sand being finely ground, wetting the mixture to a molding consistency, molding the articles, and heating them to a temperature above that required to evaporate the moisture therefrom.

11. The process of making articles of the class described, consisting in mixing silicious sand, calcium oxid, calcined pegmatite and calcined magnesia silicate, a major portion of the entire mass being sand and a substantial portion of the sand being finely ground, wetting the mixture to a molding consistency, molding the articles, and heating them to a temperature above that required to evaporate the moisture therefrom.

12. The process of making articles of the class described, consisting in mixing silicious sand, calcium oxid, calcined pegmatite, calcined magnesia silicate, and alumina in substantially the proportions stated, a substantial portion of the sand being finely ground, wetting the mixture to a molding consistency, molding the articles, and heating them to a temperature above that required to evaporate the moisture therefrom.

13. The process of making articles of the class described, consisting in mixing silicious sand, calcium oxid and calcined pegmatite, wetting the mixture to a molding consistency, molding the articles, and burning them to effect vitrification.

14. The process of making articles of the class described, consisting in mixing silicious sand, calcium oxid, calcined pegmatite and calcined magnesia silicate in substantially the proportions stated, wetting the mixture to a molding consistency, molding the articles, and burning them to effect vitrification.

15. The process of making articles of the class described, consisting in mixing silicious sand, calcium oxid, calcined pegmatite, calcined magnesia silicate and alumina substantially as described, wetting the mixture to a molding consistency, molding the articles, and burning them to effect vitrification.

16. The process of making articles of the class described, consisting in mixing silicious sand, calcium oxid and pegmatite, wetting the mixture to a molding consistency, molding the articles, drying them, and then burning to effect vitrification.

17. The process of making articles of the class described, consisting in mixing silicious sand, calcium oxid, pegmatite and magnesia silicate, wetting the mixture to a molding consistency, molding the articles, drying them and then burning to effect vitrification.

18. The process of making articles of the class described, consisting in mixing silicious sand, calcium oxid, calcined pegmatite, magnesia silicate and alumina, wetting the mixture to a molding consistency, molding the articles in thin form, drying them, and then burning to effect vitrification.

ANDREW MALINOVSZKY.

Witnesses:
GEO. L. COOPER,
JOHN H. TAYLOR.